US010275425B2

(12) United States Patent
Kernan

(10) Patent No.: US 10,275,425 B2
(45) Date of Patent: Apr. 30, 2019

(54) METHOD FOR COMPRESSING, SLICING, AND TRANSMITTING IMAGE FILES FOR DISPLAY AND INTERPRETATION

(71) Applicant: Henry Edward Kernan, Houston, TX (US)

(72) Inventor: Henry Edward Kernan, Houston, TX (US)

(*) Notice: Subject to any disclaimer, the term of this patent is extended or adjusted under 35 U.S.C. 154(b) by 0 days.

(21) Appl. No.: 15/897,150

(22) Filed: Feb. 14, 2018

(65) Prior Publication Data

US 2018/0232341 A1    Aug. 16, 2018

Related U.S. Application Data

(60) Provisional application No. 62/458,965, filed on Feb. 14, 2017.

(51) Int. Cl.

| G06F 17/00 | (2019.01) |
| G06F 17/21 | (2006.01) |
| G06F 17/24 | (2006.01) |
| G06F 3/0484 | (2013.01) |
| G06T 1/00 | (2006.01) |
| E21B 41/00 | (2006.01) |
| G06F 3/0482 | (2013.01) |

(Continued)

(52) U.S. Cl.
CPC ........ *G06F 17/212* (2013.01); *G06F 3/04845* (2013.01); *G06F 17/241* (2013.01); *G06T 1/00* (2013.01); *E21B 41/0092* (2013.01); *G06F 3/0482* (2013.01); *G06F 3/0483* (2013.01); *G06F 3/04842* (2013.01); *G06F 3/04855* (2013.01)

(58) Field of Classification Search
CPC ... G06F 17/212; G06F 17/241; G06F 3/04845
USPC .................................. 715/273, 255
See application file for complete search history.

(56) References Cited

U.S. PATENT DOCUMENTS

| 5,345,551 A | 9/1994 | Shelley |
| 6,192,392 B1 | 2/2001 | Ginter |

(Continued)

OTHER PUBLICATIONS

Gustaysson et al., Structure and Contents of a New Geomorphological GIS Database Linked to a Geomorphological Map—With an Example from Liden, Central Sweden, ScienceDirect 2008, pp. 335-349. (Year: 2008).*

(Continued)

*Primary Examiner* — Cong-Lac Huynh
(74) *Attorney, Agent, or Firm* — Katz Law Group, LLC; Gary P. Katz

(57) ABSTRACT

A method and system for dividing up large image files, for example, a subsurface wellbore log, into smaller files or slices for faster analysis and for faster transmission. The transmission and analysis can be performed over a network system for display to a user to perform data interpretation, such as geological interpretations. The side by side comparison can be individually controlled and analyzed as well as synchronized manually for comparison. The data from one or multiple different logs can be viewed side by side as smaller slices of the whole while being able to independently vary the view depth of the data from each wellbore by scrolling. Well tops, and other subsurface data, can be interpreted and shown in the well log image with associated depth registration.

20 Claims, 4 Drawing Sheets

(51) Int. Cl.
*G06F 3/0483* (2013.01)
*G06F 3/0485* (2013.01)

(56) References Cited

U.S. PATENT DOCUMENTS

| | | | |
|---|---|---|---|
| 6,496,594 B1* | 12/2002 | Prokoski | A61B 5/1176 382/118 |
| 6,714,205 B1 | 3/2004 | Miyashita | |
| 7,116,843 B1 | 10/2006 | Wensley | |
| 7,518,614 B2* | 4/2009 | Emerson | G06F 3/1454 345/502 |
| 7,607,106 B2 | 10/2009 | Ernst | |
| 7,609,911 B2 | 10/2009 | Hasuike | |
| 8,171,101 B2* | 5/2012 | Gladwin | H04L 67/1097 370/242 |
| 8,341,548 B2 | 12/2012 | Ernst | |
| 8,532,383 B1 | 9/2013 | Thakkar | |
| 2004/0199785 A1* | 10/2004 | Pederson | G07C 9/00158 340/293 |
| 2008/0301583 A1* | 12/2008 | Akagi | H04N 1/0035 715/838 |
| 2009/0279613 A1* | 11/2009 | Suzumura | H04N 19/176 375/240.25 |
| 2011/0131232 A1* | 6/2011 | Hill | G06Q 10/04 707/769 |
| 2011/0314031 A1* | 12/2011 | Chittar | G06Q 30/00 707/749 |
| 2012/0249550 A1* | 10/2012 | Akeley | H04N 5/232 345/419 |
| 2013/0021337 A1* | 1/2013 | Blum | A61B 5/055 345/419 |
| 2013/0251212 A1* | 9/2013 | Leddy | G06F 21/36 382/115 |
| 2015/0116355 A1* | 4/2015 | Hofmann | G06K 9/00671 345/633 |
| 2016/0155236 A1* | 6/2016 | Davey | G06T 19/20 382/131 |
| 2016/0217568 A1* | 7/2016 | Vancamberg | G06T 7/0012 |
| 2017/0270624 A1* | 9/2017 | Rooney | G06Q 10/06375 |
| 2018/0068037 A1* | 3/2018 | Williams | E21B 49/00 |

OTHER PUBLICATIONS

Fessler et al., Grouped-Coordinate Ascent Algorithms for Penalized-Likelihood Transmission Image Reconstruction, IEEE 1997, pp. 166-175. (Year: 1997).*

Ruessink et al., Calibration and Verification of a Parametric Wave Model on Barred Beaches, Elsevier 2003, pp. 139-149. (Year: 2003).*

* cited by examiner

METHOD FOR COMPRESSING, SLICING, AND TRANSMITTING IMAGE FILES FOR DISPLAY AND INTERPRETATION

CROSS REFERENCE TO RELATED APPLICATIONS

The present application is a United States nonprovisional patent application that claims priority to U.S. Provisional Patent Application Ser. No. 62/458,965, entitled "Method for Compressing, Slicing, and Transmitting Image Files for Display and Interpretation," filed on Feb. 14, 2017. U.S. Provisional Application Ser. No. 62/458,965 is hereby incorporated in its entirety by reference.

TECHNICAL FIELD

The present invention relates to a novel way of transmitting images. More specifically, the invention relates to improved transmitting of subsurface wellbore information and graphs for display and interpretation. Most specifically, the invention can improve the process of locating and producing hydrocarbon through improved displaying and information of well log data.

BACKGROUND

Oil and gas exploration, and production requires large amount of data collection and displaying of data. Data collection including display well logs are a vital source of information in the subsurface. These graphs represent the measurements taken by logging tools of the rocks through which the borehole has penetrated. The signals can be interpreted to indicate specific rock lithologies and fluids, both for targeting in the logged well bore and for interpolation between wellbores.

Well logs are commonly printed onto paper or stored as image files. Well logs from wells drilled years or even decades ago are still valuable information about the subsurface. The oil and gas authority of each State requires that operators submit well logs to them to make subsurface information available to the public. In a well log image, the X axis typically representing the units and scale of the logged measurement including but not limited to, resistivity, gamma ray, neutron, and other petrophysical measurements and combinations thereof. The Y axis typically represents the depth of the well. As such, these graphs are narrow in width and very long in length, with an image ratio of 1:30 or more. Printouts of these well log graphs are created in specialized printers that output folded stacks of paper inches thick. Digitally, the graphs are stored as TIF files, but can also be stored in other image and document formats, including but not limited to as PDF, GIF, JPEG files and combinations thereof.

The advent of computerized technology in the oil and gas industry has meant that the traditional technique of "hanging" well log graphs on a wall for side-by-side comparisons has given way to analysis on the screen. Because of the ratios and the size of the images (usually 2 megabytes or more), these do not open easily in standard image-viewing software, such as Windows Photo Viewer. Moreover, one image alone is of little value, since they must be compared side-by-side to be interpreted, and standard image-viewing software is not designed to open and view multiple large images side by side.

Specialized software in the oil and gas industry has attempted to display well log image files, but all current software needs a desktop operating system. Moreover, current software only allows the user to scroll the entire cross-sectional viewing window, and not individual well log images independently. Advances in technology create user expectations that information and data be available on the internet through a browser at the click of a button. The TIF formats cannot be displayed in a standard browser window using HTML. Moreover, the size of the images precludes the convenience of sending more than one image file at a time over an internet connection. It is also apparent to persons skilled in the art that a user will not want to see the image at its full height, as the ratio preludes it from being useful to interpret unless it is zoomed in.

Therefore, a need exists in the field for a novel way of compressing image files, to facilitate quick transmittal from an online database to a users' machine through the Internet. When images are in TIFF format, a method is also needed to quickly convert to a format that is usable by standard HTML code in a browser. A need also exists for a method to show the beginning of an image quickly to allow an interpreter to begin working expediently. Another need is for images to be scrolled individually and synchronously. A further need exists for software to display the images using web technologies and allow an interpreter to generate products and knowledge from the image file. Accordingly, embodiments of this invention satisfy these needs.

BRIEF SUMMARY

Systems and methods embodiments for dividing an image into slices to achieve favorable data transfer are disclosed. In one embodiment the method comprises determining how many slices the image will be divided into, represented by a whole number selected from the group consisting of division by a fixed height or width, division by a variable height or width, division to achieve a certain size of file, and any combination thereof. Each slice is stored with a repeatable pattern with a reference to the position of the slice in the larger image. The total number of slices for the image is stored in a database, which can be accessed when the sliced images are requested. Using the positioning data facilitates quickly recalling data for each position. Finally, the data is displayed based on the positional needs of the user.

In one embodiment, a method of geological interpretation is disclosed. This method comprises storing on a database, data from a plurality of wells, wherein each well is represented by a large image and the large image is divided into smaller slices. The additional steps comprise picking at least two wells on a map, returning from the database a plurality of smaller slices for each image associated any of the wells chosen, outputting at least one slice representing a portion of the large image for any of the wells chosen to a viewport, displaying images synchronously wherein a top of well log is visible quickly as lower portions of the larger image are loaded, and interpreting the images.

In another embodiment, the present invention relates to dividing an image "on the fly" using a server. This embodiment facilities quicker divisions as the image is divided upon request instead of being stored on the server and does not require pre-processing of the image. The total number of slices is calculated first so that the user's machine can prepare the display of each slice in the browser.

BRIEF DESCRIPTION OF THE DRAWINGS

For a more complete understanding of the disclosed methods and apparatuses, reference should be made to the embodiments illustrated in greater detail in the accompanying drawings, wherein.

Figure 1:
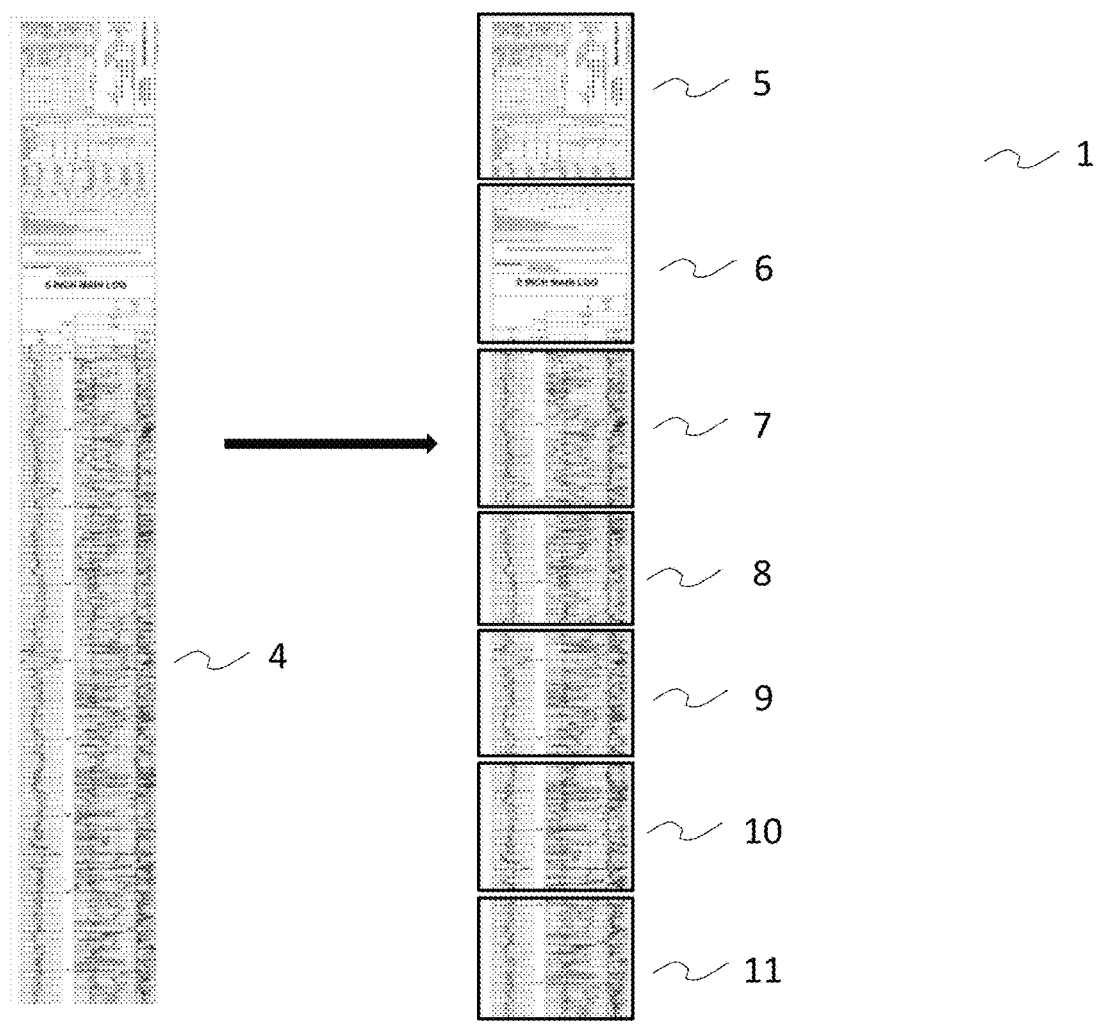
FIG. 1 illustrates how a large image file is compressed from a full image to a variable number of smaller images according to embodiments of the invention.

The drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the embodiments illustrated herein.

DETAILED DESCRIPTION

Below is a description of various embodiments of the invention. Before describing selected embodiments of the present disclosure in detail, it is to be understood that the present invention is not limited to the embodiments described herein. The disclosures and descriptions herein are illustrative and explanatory of one or more presently preferred embodiments and variations thereof. It will be appreciated by those skilled in the art that various changes in the design, organization, means of operation, structures and location, methodology, and use of equivalents may be made without departing from the spirit of the invention.

The drawings are intended to illustrate and plainly disclose presently preferred embodiments to one of skill in the art and are not intended to be renditions of final products. These may include simplified conceptual views to facilitate understanding or explanation. In addition, the relative size and arrangement of the components may differ from that shown and still operate within the spirit of the invention.

Moreover, various directions such as "upper", "lower", "bottom", "top", "left", "right", "first", "second" and so forth are made only with respect to explanation in conjunction with the drawings. The inventive components may be oriented differently, for instance, during collection, processing, displaying and interpreting operations. Numerous varying and different embodiments and modifications may be made within the scope of the concept(s) embodiments herein taught and described. Therefore, it is to be understood that the details herein are to be interpreted as illustrative and non-limiting. For example, many embodiments and examples are used to describe TIF image files. However, the invention can be used to handle any type of file format.

Oil and gas exploration, and production requires large amount of data collection and the ability to process, display and interpret such data provides a competitive advantage. In one embodiment, the present invention compromises a novel method of pre-processing and compressing the well log image files, such as TIFF files, into a database so that they may be rendered to a user's machine on request very quickly. This is accomplished by creating smaller slices of the original image and stores them using a naming convention and typically done using software. When a user wants to view the image, the slices can be loaded synchronously into a viewport, allowing the user to see the immediate area of interest of the image much faster, and loading the rest of the slices (outside the viewport) consecutively. In one embodiment, the images are made to synchronize in a fashion completely dependent on the user, not a pre-determined relation from the database. For example, the method permits loading multiple or a least two images and preferably three or more unrelated images side by side.

Another embodiment includes a method for displaying images containing subsurface wellbore data in such a way that it allows a user to interpret, gather knowledge, and generate products from the information the data sets contain. This includes, but is not limited to, a method wherein the viewport contains side by side display of separate data from selected but separate boreholes and allows the depth of the data from each borehole to be varied independently in the display, with the option to synchronize the scrolling between wellbore images. For example, the well log data can be varied by depth, horizons, geological time horizons and combinations thereof. In addition, a novel method is presented whereby the user can select a geologic top on the image and input a depth associated with that top with no need to depth register the entire image. If the image is depth registered, a novel method is presented that allows for the automatic calculation of the top using the depth registration. This geologic product, and others like it, can be exported or manipulated further for geologic interpretation to improve data collection, processing and interpretation.

The present invention will now be described by referencing the appended figures. FIG. 1 depicts how a large image 4 is sliced into multiple vertical images 1 (pre-processing) for storage and transmission. In one embodiment, the images are split in only one direction at a time and it involves multiple images. This data can be transported faster through internal networks and external networks such as, the Internet by the process wherein a large image file is compressed from a full image to a variable number of smaller images. The individual slices can be labelled by image name and number and represented slices are shown by reference numerals 5, 6, 7, 8, 9, 10 and 11. The slices that make up this compression can be saved for subsequent retrieval in storage accessible to the end user. The number of slices and the name of the file once saved to a database are quickly accessible to the end user. The image slices and database do not need to reside together and may serve as a reference to data within for retrieval purposes.

The slicing of the image can be accomplished using multiple method or process steps. In a preferred embodiment, first, the entire image is scaled to be less than 500 pixels and preferably less than 400 pixels in width, with the height aspect ratio kept the same. This reduces the size of the image and is the first step in the compression that allows transmission of the data quickly over the internet. Secondly, the height of the image is divided by a set variable crop height (such as, less than 400 pixels or preferably 300 pixels or less) and the number returned, n, is rounded up so that a whole number represents the number of crop height slices that the image can be sliced into. The values for n is dependent on the height of the image but can range from 5 to 500. The third step is for the image to be sliced into n smaller images, each of the same crop height. This can be done using an image manipulation library in any language, for example the ImageMagick library in PHP or PILLOW library in Python.

The slicing may be performed using an iteration of steps. First, a variable to hold the increments is defined, for example variable i=0. The first slice is created by cropping the image from pixel crop height*i to pixel crop height*i+ crop height. In this example, the first slice would go from 300*0=0 to 300*0+300=300. Crop heights are meant to keep slice size smaller than 1 MB for easy transmission, which typically requires at least 100 pixels to have the required resolution and less than 1,000 pixels for easy transmission. A more preferred range requires at least 260 pixels and less than 750 pixels. This slice is named using a convention that makes it easy to retrieve, an example of which is "file_name_i", as in "file_name_0". At the end of the first step, variable i is incremented by 1. The second slice is created by iterating over the original image, until the condition i=n is met and all the slices have been created. These smaller slices can also be further reduced in resolution to reduce their size in the database, and for transmission. The variable n which represents the number of slices created is stored in a database along with the original file name, an example of which is a table with two columns, one titled "image name" and the other "number of slices". The "image name" column also exists in a separate table in the same database where the well identification and other information about the well are stored. If generating the slices "on the fly", the number of slices can be calculated and transmitted to the user's machine "on the fly" as well. "On the fly" can be defined as dividing and sending slices of data when a user requests an image instead of preprocessing the slices beforehand. In one embodiment, the user selects a well of interest, the request is received by the server, which then slices the image and stores the slices on the server. The user's browser then retrieves the slices synchronously from the server.

Figure 2:
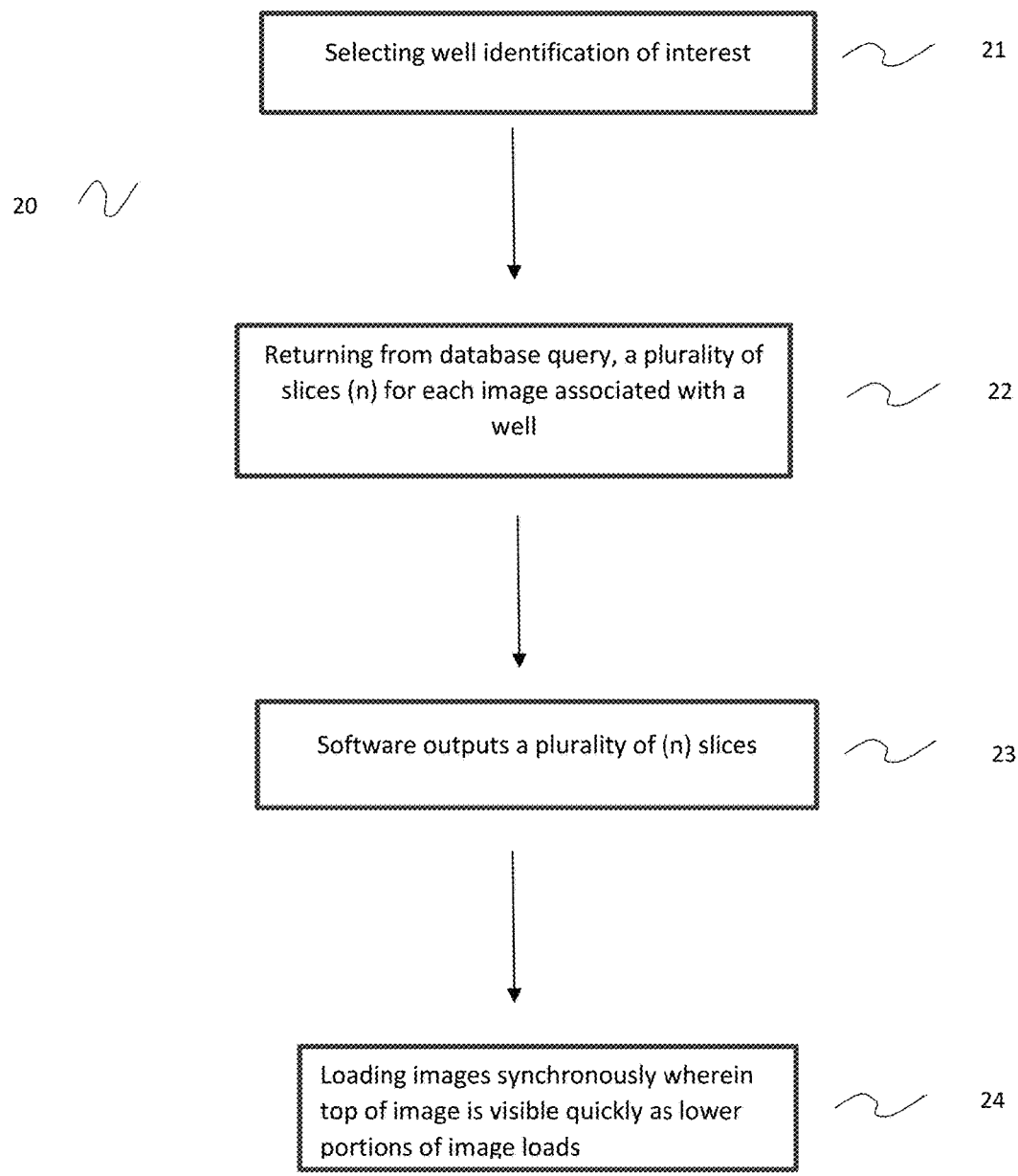
FIG. 2 illustrates a schematic showing the process by which the interpretation uses the image database or information generated "on the fly" to render the smaller images as one larger representation according to embodiments of the invention.

FIG. 2 illustrates an embodiment wherein the slices are retrieved for viewing by the user. In one embodiment, process 20), typically performed by an interpretation software, uses the image database to render the smaller images as one larger representation.

As show in FIG. 2, the database can store the wellbore data by assigned well identification. When the user selects the identification of a well of interest 21, the database is queried in such a way that the file name for the image along with the number of slices (n) is retrieved 22. Given the file name, the software then retrieves the image slices using the path to the slices' storage location and the convention established when the slices were stored, one example of which is "file_name_n". The process follows a routine by which it retrieves n number of slices 23 and these sliced images are loaded in consecutive order, to favorably fit together to form representation of the larger, original image 24. For example, a benefit of this method is that the slices can be loaded synchronously to speed up processing time. The number of slices is dependent on the size of the image. In one embodiment, at least 5 slices can be displayed initially to allow the user to work on the image while additional slices representing additional sections of the unit are being loaded. Accordingly, this process can display at least 50 and up to 500 logs a minute, synchronously and side-by-side, which is a significant increase from the 1 to 5 logs a minute a geologist could view using paper or standard image viewing software. Because of the nature of the extreme ratio of the image, the user will rarely want to see the entire representation at once. The ability to load only the slices that represent the immediate area of interest to the user, in this case the top of the image, first and very quickly therefore gives the user the ability to much more expediently start using the image in the viewport, as the subsequent slices are loaded into the non-visible portion of the document.

In one embodiment the user identifies a plurality of large images the user desires to view and further comprising transmitting the plurality of large images to a viewport. The viewport can contain, a map with identifying well spots, a search with filters, a request to access a database in some other format, and other features. Preferably, the software will have a script for rebuilding the large image. That script can use the repeatable pattern established during storage and loading of each large image synchronously wherein the smaller slices being viewed in the viewport are accessible faster than the entire large image.

In situations with a plurality of large images associated with wellbores, the images can be loaded into separate divisions. In one embodiment, that user process involves, labelling tabs that indicate a type of image, providing an ability for the user to switch between the tabs, and moving the tabs wherein any chosen image can appear next to a second chosen image. This allows for quick viewing and interpretation of multiple large files.

Another beneficial embodiment involves images that are next to each other can be individually scrolled and synchronously scrolled. That embodiment can involve a scroll bar for each wellbore image, an identifier that indicates the user wants to scroll the images together, and an additional script that recognizes what images are being scrolled and adjusts their height in the viewport accordingly as scrolling occurs.

In situations where the large image represents well log data and the user can click on an image and generate a geologic marker. In one embodiment that process involves creating an editable label for the geological marker, inputting the depth of the geological marker, and providing the user an ability to move and delete the geological marker from the large image. Furthermore, the plurality of large images being displayed can represent a cross-section identified on the map. In that situation the user or software can use a differentiating symbol for wells on the cross-section from wells not on the cross-section and create a line connecting the cross-section wells. Finally, any well can be added and removed from the cross-section view and line by clicking a symbol wherein the user performs a script to remove the well from the cross-section viewport and a collection of cross-section wells represented on the map. The geological interception can then be used for locating and producing subterranean hydrocarbons. While this process has been described as a method for improving geological interpretation, this method can be used for different data storage, transmission and interpretation processes that requires large data files.

Figure 3:
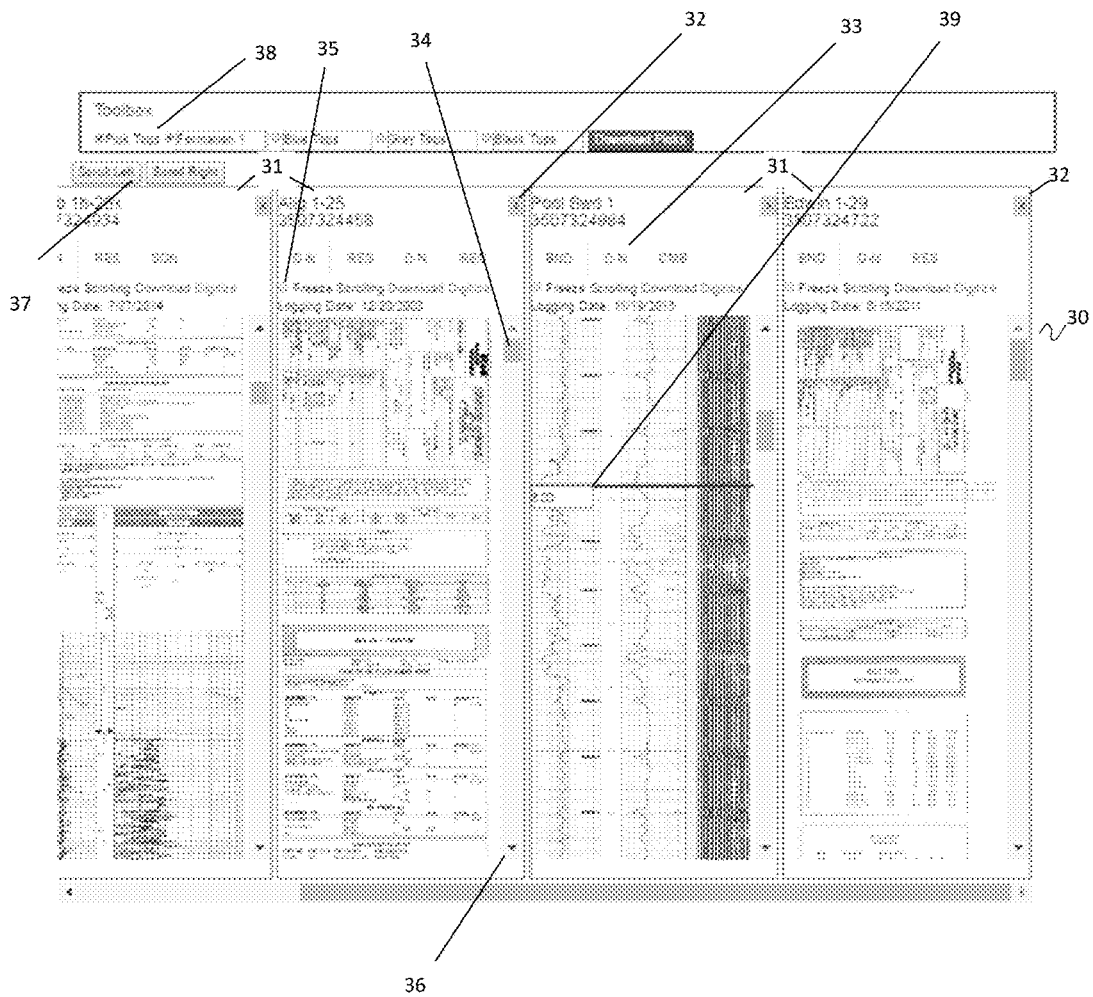
FIG. 3 illustrates how the data can be displayed according to embodiments of the invention.

FIG. 3 illustrates an example of the cross-section area or viewport 30 into which the images are loaded. In one embodiment, the viewport displays the cross-section. In one embodiment, the display shows multiple images that are not related or contiguous. Each division is outlined with a black line 31 and having an X 32 in the upper right corner represents a well. Wells may have multiple associated image files, which are loaded into tabs 33. Images that are larger than the viewport height can be scrolled through 34. A selection can be made to synchronize the scrolling of images from separate well bores 35. Appending more well bores increases the size of the viewport with a scroll bar 36, which can also be scrolled using buttons 37. A toolbox area 38 allows the interpreter to generate well tops with an input box for depth 39 without the need to depth register the image. If a log has been depth registered, the correct depth is calculated from the pixel value of the click.

Each of the divisions outlined with a black line 31 and having an "X" 32 in the upper right corner represent a well, identified by some identification. In this example, an American Petroleum Institute (API) number and a name. As would be apparent to one skilled in the art, with the benefit of the disclosure herein, a cross-section is a useful tool for interpreting the subsurface location of geologic formations and associated fluids. A well can have more than one image log associated with it that would be of interest to the user. Each well image is loaded into a separate division inside the well division, but only one of these image divisions is made visible initially.

The user can select another division by clicking on a tab, which in FIG. 3 is marked by reference numeral 33. Each well division has a certain height which will most likely be less than the height of the image. Therefore, each well division has an independent scroll bar to accommodate the full height of the image, which in the figure is marked by reference numeral 34. A user may want to scroll two images from different wells synchronously, in which case they can select the checked box marked by reference numeral 35 and labeled "freeze scrolling" for each well they want to scroll. When this box is checked, a script within the software will recognize which image is being scrolled and then identify each image that is marked to scroll synchronously. It will then move those other images as many pixels as the scrolled image is moving, either up or down.

As the user selects more wells, wellbore images are appended to the cross section. The viewport of the cross section grows with the aid of a scrollbar, which in the figure is identified by reference numeral 36. This allows the number of wells and well bore images that can be displayed to be over 100 images, more preferably over 250 images and most preferably over 500 images regardless of the viewing screen width. Scrolling can also be accomplished with the aid of buttons that move the cross-section a set amount left or right, an example of which is marked in FIG. 3 by reference numeral 37.

FIG. 3 also shows a toolbox area, identified by reference numeral 38. Many tools are possible for generating geologic products from the image files. One example, as shown in FIG. 3 is a novel method for picking geologic tops. Those skilled in the art will recognize that a line drawn on an image has no depth information associated with it. The invention presents a novel way to draw geologic top information by appending an input box with each geologic top that is picked by the user (through a click). The geologic top or marker can represent depth, a formation horizon, geological time event, and combination thereof. The user can then input the depth associated with that top. They can also edit the name of the top in the input boxes in the toolbox area. The geologic top can be deleted and/or moved. This method replicates the way geologic tops are captured and recorded on paper logs, but with the advantages of digital medium (replication, accessibility, etc.). The geologic top information can be downloaded to a CSV file with the associated well information, such as but not limited to latitude, longitude, API number, well name, ground elevation, and Kelly bushing elevation.

Figure 4:
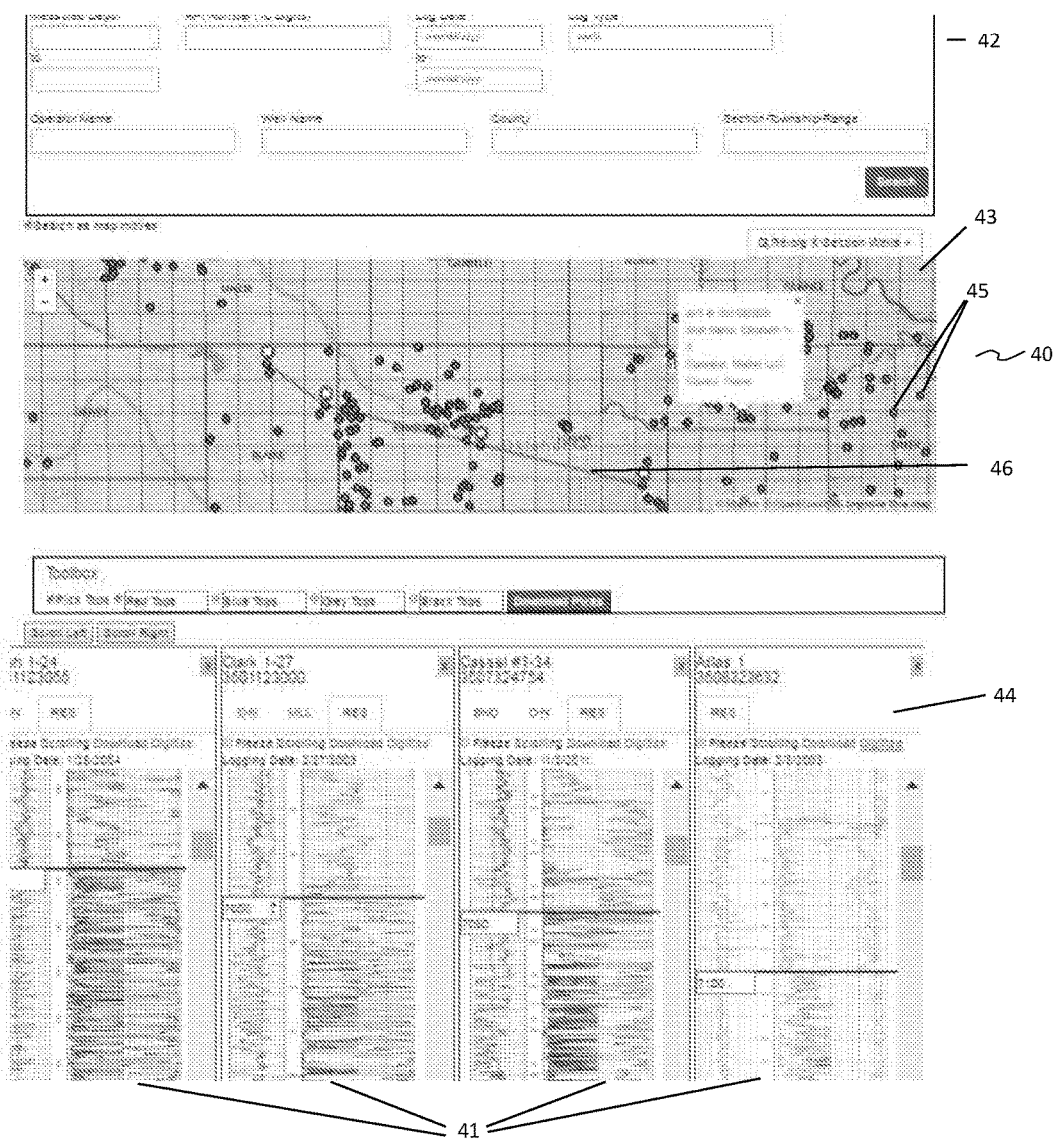
FIG. 4 illustrates displaying multiple images next to each other in a cross-section view by selecting well spots on a map to assist interpretation according to embodiments of the invention.

FIG. 4 shows an interpretation embodiment 40 of the application of the invention. In this embodiment, the interpretation software allows a user to display multiple images next to each other in a cross-section view by selecting well spots on a map As shown in FIG. 4, the search area identified by reference numeral 42 is where a user can enter search criteria to filter well spots on the map. The search criteria may be varied with the use of differing databases. The map identified by reference numeral 43 is where the user selects one or more wellbores 45 of interest. The area identified by reference numeral 44 is where the images slices 41 are loaded into a cross-section view for an interpreter to analyze.

Other elements of interest in the invention are the differentiating markers identifying wells as being part of the cross-section, the line 46 connecting the selected wells identifying the trajectory of the cross-section in map view, and the to remove certain wells from the cross-section view and have that reflect on the map, and the ability to reorganize the wells in a cardinal direction or other metric.

Example

A system and method are created using software that is available through the internet to store, process and display well log data using a software. The user can then use the internet to connect his electronic device to the server running the script or software. In the example provided below, the invention relates to quickly transmitting for display images that are over 2 megabytes in size and have an aspect ratio of 1:30 or more. A plurality of images can be transmitted to user, and individual images are displayed next to one another for the creation of a geologic cross-section used in subsurface interpretation. The images can be scrolled individually and made to synchronize scrolling.

The method described references techniques used by subsurface scientists to study data contained in images in a similar way as doing it with paper printed images. The purpose is to display non-related images quickly, side by side, and draw on them to capture an understanding of the subsurface. The resolution of the images is important but the images themselves are mostly black or colored lines on a white background, not high-resolution pictures of the natural world or people. Transmission is a problem, however, because of the high ratio of the images, their disconnected state until a user selects a subset to study, and the necessity to then display them side by side in a geologic cross section for viewing and interpretation. As shown by the example below, the process when compared to prior art systems, the new process provides significant benefits.

All prior art systems for viewing well log image files rely on a desktop system. Although this system may be connected to the internet and intranet to allow file to be shared across a network, the software is not optimized to view images sent quickly over said network. This is due to the size of the image, which can be from 1 MB to most commonly 6 MB and up to 50 MB in size. Although networks speeds have been increasing, recent developments have highlighted the need for faster transmission of electronic data. A subsurface scientist will very rarely want to look at an entire log image at once, because the high ratio of the image and the nature of the technique of study precludes viewing an image in its entirety. Prior systems, however, have dealt with entire images only, making the display of multiple images dependent on the RAM of the desktop computer. The novel process presented here is optimized for sending images over slower networks; it works with 3G cellular networks with speeds as low as 1.1 megabytes per second (MPS) because only a slice of the image, of significantly less size than the entire image, is transmitted. Prior art focused on sending across one such image, but this invention allows users to have significant benefits because they can pick multiple, unrelated images. For example, in a desktop system a user may want to study the subsurface of the Permian Basin of Texas. Because prior software systems expect files to be on a local hard drive or network, the user would have to download such files into a repository this software could read. The prior software would then load the entire image into memory and display it on the screen. If there are more than 10 images, as is likely in the study of a large area, the system would get bogged down and slow in response. Visualizing 100 images in such a way would be very difficult, and 1,000 would be impossible. With the novel method presented herein, a user can log into a website with only browser software, which is distributed in almost all computer system. The user can click on a well spot and bring up an image, adding it to a cross-section for viewing. The user could load hundreds of images very quickly and could possible load multiple thousands. This is due to the way the images are delivered, the techniques in retrieving the images from the database associated with a map, and the novel method of displaying these images in a browser.

Most data in the subsurface is held in image files. The data mostly useful when comparing the logs from different wells next to each other. One technique to compare these logs is "sliding" them, which means moving them together to see what reservoir intervals are similar in each well. Traditionally well logs are printed into folded paper that stacks inches thick. Geologists and other subsurface scientists hang these logs on a wall to form a cross section they can interpret. Desktop software allows users to re-create this technique on a computer screen, but they require the log image files to be present on the computer or accessible through the intranet of the company. This is due to their size.

The WellLogData™ process simplifies all of this by allowing users to call up images through the internet. The time savings in log image delivery mean that millions of logs can potentially be offered to the user to call up, instead of tens or hundreds. The user doesn't need to download the logs to his computer as an entire file and then import it into another software as the software is now melded with the delivery mechanism (such as, the internet) into a seamless process. Other applications have been developed to transmit high quality images over the internet, but the WellLogData™ process transmits not high quality but high density of information, all of it disjointed until the user selects it. The process enables the user to have the ability to call upon millions of images instead of one at a time. Speed is important because when a user investigates the subsurface they may call upon and scan 100 logs before settling on the 10 they wish to interpret. The process of scanning these 100 logs in paper copies would take weeks. The process of scanning these 100 logs on traditional desktop software would take days, because of loading time into the software. The process of scanning these 100 logs on WellLogData™ takes minutes, because they are instantly available and delivered quickly online.

Although the embodiments of the present disclosure and their advantages have been described in detail. However, there are changes, substitutions and alterations can be made herein without departing from the spirit and scope of the disclosure as defined by the appended claims. Moreover, the scope of the present application is not intended to be limited to the embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for dividing each of large images of well data into smaller slices for viewing comprising:
    a. establishing a number of the smaller slices that each of the large images of well data will be divided into, represented by a whole number wherein the whole number is selected from the group consisting of division by a fixed height, division by a fixed width, division by a variable height, division by a variable width, and any combination thereof, of the large image of each well data;
    b. storing with a repeatable pattern the smaller slices wherein, the smaller slices reference positions of the smaller slices in the large image of each well data;
    c. recording a total of the number of the smaller slices for the large image of each well data along with a file name, wherein the file name represents the position of each of smaller slices in the large image of each well data;
    d. identifying, by a user, a plurality of large images of wells the user desires to view in the viewport;
    e. transmitting the plurality of large images of wells identified to a viewport; and
    f. rebuilding, using a script, each of the identified large images of wells that uses the repeatable pattern established during storing, and loading of each rebuilt large image synchronously for viewing in the viewport wherein the smaller slices being in the viewport are accessible faster than an entire large image.

2. The method of claim 1 wherein the viewport comprises a map with well locations, a search with filters, and a request to access a database of well spots.

3. The method of claim 1, wherein the plurality of large images associated with wellbores are loaded into separate divisions, further comprising:
    a. labelling tabs that indicate divisions of each of the large images of well data, and
    b. providing an ability for the user to switch between tabs.

4. The method of claim 3, wherein images that are next to each other can be individually scrolled and synchronously scrolled, further comprising
    a. a scroll bar for each wellbore image;
    b. an identifier that indicates the user wants to scroll the images together; and
    c. an additional script that recognizes what images are being scrolled and adjusts their height in the viewport accordingly as scrolling occurs.

5. The method of claim 4, wherein the large image represents well log data and the user can click on an image and generate a geologic marker, further comprising:
    a. creating an editable label for the geological marker
    b. inputting the depth of the geological marker; and
    c. providing the user an ability to move and delete the geological marker from the large image.

6. The method of claim 5, wherein the plurality of large images being displayed represents a cross-section identified on the map, further comprising: using a differentiating symbol for wells on the cross-section from wells not on the cross-section and creating a line connecting the cross-section wells.

7. The method of claim 6, wherein any well can be added and removed from the cross-section view and line, further comprising: clicking a symbol wherein the user performs a script to remove the well from the cross-section viewport and a collection of cross-section wells represented on the map.

8. The method of claim 7, wherein the wells on the cross-section can be organized by their locations and their at least one additional property, further comprising:
   a. creating a dropdown menu with an indication of how the wells will be organized;
   b. creating a script that performs a reorganization of the wells by identifying their locations and their at least one additional property; and
   c. creating a script rearranging large images of well data representing the wells in the cross-section viewport.

9. The method of claim 8 wherein the at least one additional property represents a cardinal direction of the line on the map.

10. The method of claim 1, wherein more than one identified images of wells are selected by the user to view side by side in the viewport.

11. A method of geological interpretation, comprising:
   a. storing on a database, data from a plurality of wells, wherein each well is represented by a large image and the large image is divided into smaller slices;
   b. picking at least two wells on a map;
   c. returning from the database a plurality of smaller slices for the large image associated with any of the well chosen;
   d. outputting at least one slice representing a portion of the large image for any of the wells chosen to be viewed in the viewport;
   e. displaying images of the plurality of smaller slices synchronously wherein a top of well log is visible quickly as lower portions of the large image are loaded; and
   f. interpreting the images.

12. The method of claim 11 wherein a geological interception is used for locating and producing subterranean hydrocarbons.

13. The method of claim 12, further comprising: using a script for rebuilding the large image that uses the repeatable pattern established during storage and loading of each large image synchronously wherein the smaller slices being viewed in the viewport are accessible faster than the entire large image.

14. The method of claim 13, wherein the plurality of large images associated with wellbores are loaded into separate division, further comprising:
   a. labelling tabs that indicates divisions of each of the large images of well data, and
   b. providing an ability for the user to switch between tabs.

15. The method of claim 14, wherein images that are next to each other can be individually scrolled and synchronously scrolled, further comprising
   a. a scroll bar for each wellbore image;
   b. an identifier that indicates the user wants to scroll the images together; and
   c. an additional script that recognizes what images are being scrolled and adjusts their height in the viewport accordingly as scrolling occurs.

16. The method of claim 15, wherein the large image represents well log data and the user can click on an image and generate a geologic marker, further comprising:
   a. Creating an editable label for the geological marker;
   b. inputting the depth of the geological marker; and
   c. providing the user an ability to move and delete the geological marker from the large image.

17. A system for dividing each of large images of well data into smaller slices for viewing comprising a computer for running a program to perform the following steps:
   a. establishing a number of the smaller slices that each of the large images of well data will be divided into, represented by a whole number wherein the whole number is selected from the group consisting of division by a fixed height, division by a fixed width, division by a variable height, division by a variable width, and any combination thereof, of the large image of each well data;
   b. storing with a repeatable pattern the smaller slices wherein, the smaller slices reference positions of the smaller slices in the large image of each well;
   c. recording a total of the number of the number smaller slices for the large image along with a file name, wherein the file name represents the position of each of smaller slices in the large image of each well;
   d. identifying, by a user, a plurality of large images of wells the user desires to view in the viewport;
   e. transmitting the plurality of large images of wells identified to a viewport; and
   f. rebuilding, using a script, each of the identified large images of wells that uses the repeatable pattern established during storing, and loading of each rebuilt large image synchronously for viewing in the viewport wherein the smaller slices being in the viewport are accessible faster than an entire large image.

18. The system of claim 17, wherein the viewport comprises a map with identified well spots, a search with filters, and a request to access a database of well spots in some other format.

19. The system of claim 17, wherein the computer is a server and the electronic device used by the user is connected to the server and wherein the computer and the electronic device are connected to a network.

20. The system of claim 17, wherein the identified large images of wells represent unrelated well images the user desires to view side by side in the viewport.

* * * * *